(12) United States Patent
Durantay et al.

(10) Patent No.: US 12,081,085 B2
(45) Date of Patent: Sep. 3, 2024

(54) METHOD FOR SIZING A ROTOR WITH A NON-THROUGH SHAFT, ASSOCIATED ROTOR AND MOTOR-COMPRESSOR SET

(71) Applicant: GE ENERGY POWER CONVERSION TECHNOLOGY LIMITED, Warwickshire (GB)

(72) Inventors: Lionel Durantay, Frouard (FR); Clement Biri, Champigneulles (FR); Christophe Galmiche, Toul (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 51 days.

(21) Appl. No.: 17/220,869

(22) Filed: Apr. 1, 2021

(65) Prior Publication Data
US 2021/0320543 A1    Oct. 14, 2021

(30) Foreign Application Priority Data

Apr. 1, 2020 (EP) ..................................... 20315095

(51) Int. Cl.
*H02K 17/16* (2006.01)
*H02K 1/22* (2006.01)
(Continued)

(52) U.S. Cl.
CPC ............. *H02K 17/168* (2023.05); *H02K 1/22* (2013.01); *H02K 17/00* (2013.01); *H02K 17/16* (2013.01);
(Continued)

(58) Field of Classification Search
CPC ........ H02K 7/14; H02K 7/16; H02K 15/0012; H02K 7/166; H02K 7/003; H02K 1/02;
(Continued)

(56) References Cited

U.S. PATENT DOCUMENTS 2,421,860 A * 6/1947 Winther ............... H02K 17/165
                                                 310/210
5,512,792 A * 4/1996 Bawin .................. H02K 17/165
                                                 310/211

(Continued)

FOREIGN PATENT DOCUMENTS

CN       106936258 A  *   7/2017
EP        3121449 A1      1/2017
(Continued)

OTHER PUBLICATIONS

Machine Translation of CN 106936258 A (Year: 2017).*
(Continued)

*Primary Examiner* — Alexander A Singh
(74) *Attorney, Agent, or Firm* — Wood IP LLC; Theodore A. Wood

(57) ABSTRACT

The rotor for an electrical machine with a non-through shaft intended to drive a transmission line comprises two half-shafts enclosing a cylindrical magnetic mass.
The magnetic mass comprises at least two adjacent identical cells, the cells being configured to prevent the propagation of metadamping in the rotor over a range of excitation frequencies of the transmission line, the rotation frequency range of the transmission line being hypercritical.

17 Claims, 4 Drawing Sheets

(51) Int. Cl.
  *H02K 17/00* (2006.01)
  *F04B 35/04* (2006.01)
  *G10K 11/162* (2006.01)
  *H02K 1/30* (2006.01)
  *H02K 15/00* (2006.01)

(52) U.S. Cl.
  CPC ............ H02K 17/165 (2013.01); *F04B 35/04* (2013.01); *G10K 11/162* (2013.01); *H02K 1/30* (2013.01); *H02K 15/0012* (2013.01)

(58) Field of Classification Search
  CPC .. H02K 1/22; H02K 1/30; H02K 1/28; H02K 21/14; H02K 17/165; H02K 17/16; H02K 17/168; H02K 17/00; G10K 11/16; G10K 11/161; G10K 11/162; G10K 11/172; F04B 35/04
  USPC .............................................. 310/156.78, 211
  See application file for complete search history.

(56) References Cited

U.S. PATENT DOCUMENTS

| | | | | |
|---|---|---|---|---|
| 6,097,115 | A * | 8/2000 | Tevaarwerk | H02K 1/28 310/216.016 |
| 6,177,750 | B1 * | 1/2001 | Tompkin | H02K 1/28 310/216.127 |
| 6,404,091 | B1 * | 6/2002 | Nakamura | H02K 3/12 310/179 |
| 2003/0098627 | A1 * | 5/2003 | Mitchell | H02K 7/003 310/156.08 |
| 2008/0246362 | A1 * | 10/2008 | Hirzel | H02K 21/12 310/156.02 |
| 2010/0045132 | A1 * | 2/2010 | Zaps | H02K 15/03 310/156.21 |
| 2010/0231069 | A1 * | 9/2010 | Liao | H02K 1/02 188/267.2 |
| 2013/0025961 | A1 * | 1/2013 | Koh | G10K 11/162 181/207 |
| 2014/0227079 | A1 * | 8/2014 | Gilarranz | F04D 29/266 415/124.2 |
| 2016/0190878 | A1 * | 6/2016 | Saari | H02K 15/024 310/59 |
| 2017/0141706 | A1 * | 5/2017 | Kobayashi | H02K 7/003 |
| 2021/0320543 | A1 * | 10/2021 | Durantay | H02K 15/0012 |
| 2022/0294304 | A1 * | 9/2022 | Michael | H02K 17/165 |

FOREIGN PATENT DOCUMENTS

| | | | |
|---|---|---|---|
| EP | 36276591 A | 3/2020 | |
| WO | WO-2017157384 A1 * | 9/2017 | ............ H02K 5/24 |

OTHER PUBLICATIONS

Machine Translation of WO 2017157384 A1 (Year: 2017).*
Kim et al ("Rotor Design for Hyper Speed Permanent Magnet Motor", PCIM 1999).*
European Search Report for EP Application No. 20315095.8 dated Sep. 23, 2020, 10 pages.

* cited by examiner

METHOD FOR SIZING A ROTOR WITH A NON-THROUGH SHAFT, ASSOCIATED ROTOR AND MOTOR-COMPRESSOR SET

FIELD OF THE INVENTION

The present invention relates to mechanical systems comprising a rotor without a through shaft.

The present invention also relates to a motor-compressor set comprising such a rotor.

BACKGROUND

FIG. 1 illustrates an example of a motor-compressor set 1 according to the prior art including a rotary electrical machine 2 connected to a compression section 3.

The rotary electrical machine 2 comprises a stator 4 wherein there is inserted a rotor 5 with a through shaft including a shaft 5a passing through magnetic plates 5b and driving the compression section 3 at a rotation speed $\Omega$.

The compression section 3 comprises compression wheels 6 mounted on a shaft 7 of the section 3.

The shaft 7 of the section 3 is connected to the shaft 5a of the rotor 5.

Bearings 8 and 9 maintain the rotor shaft 5a and the shaft 7 of the section 3 in rotation on an axis A.

The bearings 8 and 9 comprise for example magnetic bearings or fluid bearings such as oil, water or gas bearings.

A fluid is generally injected into the casing of the motor-compressor set in order in particular to cool the rotary electrical machine 2, for example a gas or a liquid.

In a variant, the casing of the motor-compressor set 1 is empty.

The bearings 8 and 9 preferably include magnetic bearings generally having a control cutoff frequency of 5.5 kHz.

Generally, in operation, the rotation speed of the rotor shaft 5a is determined so that the transmission line, comprising the rotor 5 and the shaft 7, does not pass through the first direct-precession bending mode, the transmission line not operating in a hypercritical speed domain.

Operation of the transmission line in a hypercritical speed domain causes a loss of stability of the system in rotation comprising the motor 2 and the compression section 3 that may result in the destruction thereof.

The hypercritical transmission shaft line comprises several bending resonant frequencies (eigenmodes) between the first direct-precession bending eigenmode and the control cutoff frequency of the magnetic bearings 8 and 9 that may dynamically deform the magnetic mass, control of the magnetic bearings 8 and 9 exciting said eigenmodes.

This loss of stability is generated by the appearance of metadampings appearing to a preponderant extent in the plates 5b of the laminated rotor 5 when the transmission line exceeds the critical speed.

The overall efficiency of the motor-compression set 1 does in particular depend on the rotation speed of the shaft 7.

This limitation of the usable-speed domain degrades the efficiency of the motor-compressor set 1.

FIG. 2 illustrates a schematic dynamic model of the transmission line of the motor-compressor set 1 in a fixed reference frame (X, Y, Z).

The rotor 5 is represented by its mass $M_R$, its stiffness $K_R$, its internal damping $D_R$, a coefficient $\alpha$ representing the gyroscopic effects applied to the shaft 5a and proportional to the polar moment of inertia of the rotor 5, and its center of gravity G.

The fluid injected into the casing of the motor-compressor set 1 is modeled by a mass $M_C$, a damping coefficient $D_C$ and a stiffness $K_C$.

The rotor of the compression section 3 comprising the shaft 7 and the wheels 6 is represented by its stiffness $K_{DISP}$ and its mass $M_{DISP}$.

The pressure forces exerted on the wheels 6 are ignored, the compression section being designed to minimize them.

The bearings 8 and 9 are represented by stiffness coefficients $K_{BY}$ along the axis Y and $K_{BZ}$ along the axis Z, and damping coefficients $D_{BY}$ along the axis Y and $D_{BZ}$ along the axis Z.

Let $M_L$ be the mass of the whole of the transmission line equal to the sum of the mass $M_R$ and of the mass $M_{DISP}$, and $K_L$ the stiffness of the transmission line equal to the sum of the stiffness $K_R$ and of the stiffness $K_{DISP}$.

According to the general engineering equations, the instability speed $\Omega_{INST}$ of the transmission line is:

$$\Omega_{INST} = \left\{ \frac{K_Y + K_Z}{2 \cdot (M_L + M_C - \alpha)} \cdot \left(1 + \frac{D_C + \frac{D_{BY} + D_{BZ}}{2}}{D_R}\right)^2 + \frac{(K_Y - K_Z)^2}{4 \cdot D_R^2} \right\}^{1/2} \quad (1)$$

$$\text{where } K_Y = \frac{1}{\frac{1}{K_{BY}} + \frac{1}{K_L} + \frac{1}{K_C}} \quad (2)$$

$$\text{and } K_Z = \frac{1}{\frac{1}{K_{BZ}} + \frac{1}{K_L} + \frac{1}{K_C}} \quad (3)$$

In order to increase the instability speed $\Omega_{INST}$, a first solution consists of modifying the bearings 8 and 9 so as to increase the stiffnesses $K_{BY}$ and $K_{BZ}$ and/or to increase the dampings $D_{BY}$ and $D_{BZ}$.

However, it is difficult to modify the characteristics of the bearings, in particular in the case of magnetic bearings having identical stiffnesses $K_{BY}$ and $K_{BZ}$ that are very small compared with the thickness $K_L$, and equal dampings $D_{BY}$ et $D_{BZ}$.

A second solution for increasing the instability speed $\Omega_{INST}$ consists in increasing the stiffness $K_L$ of the transmission line or reducing the mass $M_L$ of the transmission line.

However, the transmission line is sized to transmit a sufficient mechanical power between the electrical machine 2 and the compression section 3, and modifying at least one characteristic of the transmission line may cause damage thereto.

A third solution for increasing the instability speed $\Omega_{INST}$ consists of acting on the internal damping $D_R$ of the rotor 5 dependent on the rotation speed of the rotor 5, by minimizing the internal damping $D_R$, that is to say by pushing back the frequency domain where metadampings appear.

The document US 2013/0025961 discloses that a structure comprising a periodic arrangement of cells forming the structure can increase metadampings in a predetermined range of frequencies.

Furthermore, as the rotary electrical machine 2 comprises the rotor 5 with through shaft 5a, the peripheral speed of the rotor is limited to 200 m/s in order to limit the concentration of stresses in the magnetic plates 5b generated under the effect of the centrifugal force and liable to damage the rotor.

This limitation of the rotation speed degrades the efficiency and the compression ratio of the motor-compressor set 1.

SUMMARY

It is therefore proposed to overcome all or some of the drawbacks of the mechanical systems driven by a rotary electrical machine according to the prior art, in particular by sizing the rotor so that the rotary electrical machine turns at a rotation frequency higher than the hypercritical rotation frequency of the transmission line while remaining stable.

In the light of the above, a rotor is proposed for an electric machine with a non-through shaft intended to drive a transmission line, comprising two half-shafts enclosing a cylindrical magnetic mass.

The magnetic mass comprises at least two adjacent identical cells, the cells being configured to prevent the propagation of metadamping in the rotor over a frequency range of excitation of the transmission line, the rotation frequency range of the transmission line being hypercritical.

According to one feature, each cell comprises at least one circular element.

Advantageously, each cell includes at least two circular elements.

Preferably, the two circular elements comprise identical or different outside diameters.

According to another feature, the two circular elements are made from identical materials or each plate being made from a different material.

Advantageously, each circular element is produced from magnetic steel, copper or plastics material.

According to yet another feature, the rotor furthermore comprises two short-circuit disks and two conductive bars housed in the circular elements in order to form a squirrel cage.

Preferably, the hypercritical rotation frequency range extends from 0 to 500 Hz.

According to another aspect, a rotary electrical machine comprising the rotor as defined above is proposed.

Preferably, the rotary electrical machine is of the squirrel-cage asynchronous type.

According to yet another aspect, a mechanical system is proposed comprising the rotary electrical machine as defined above and a mechanical device comprising a transmission shaft, the transmission shaft being connected to one of the rotor half-shafts.

According to another aspect, a motor-compressor set is proposed, comprising at least one compression section, and the rotary electrical machine as defined above and driving said compression section.

According to yet another aspect, a method for sizing a rotor with a non-through shaft for an electric machine driving a transmission line is proposed.

The method comprises a sizing of a cell so as to prevent the propagation of metadamping in the rotor over a range of excitation frequencies of the transmission line, the rotation frequency range of the transmission line being hypercritical, the rotor comprising two half-shafts enclosing a cylindrical magnetic mass comprising at least two adjacent identical cells.

According to one feature, the hypercritical rotation frequency range extends from 0 to 500 Hz.

Preferably, the sizing of the cell including at least one circular element is done analytically using a beam model.

Other features and advantages of the invention will emerge from a reading of the following description of embodiments of the invention, given solely by way of non-limitative examples and with reference to the drawings disclosed herewith.

FIGS. 1 and 2, already mentioned, illustrate a motor-compressor set according to the prior art;

DETAILED DESCRIPTION

As used throughout, the term "figure" is equivalent to FIG., which is an acronym for Figure.

Figure 1:
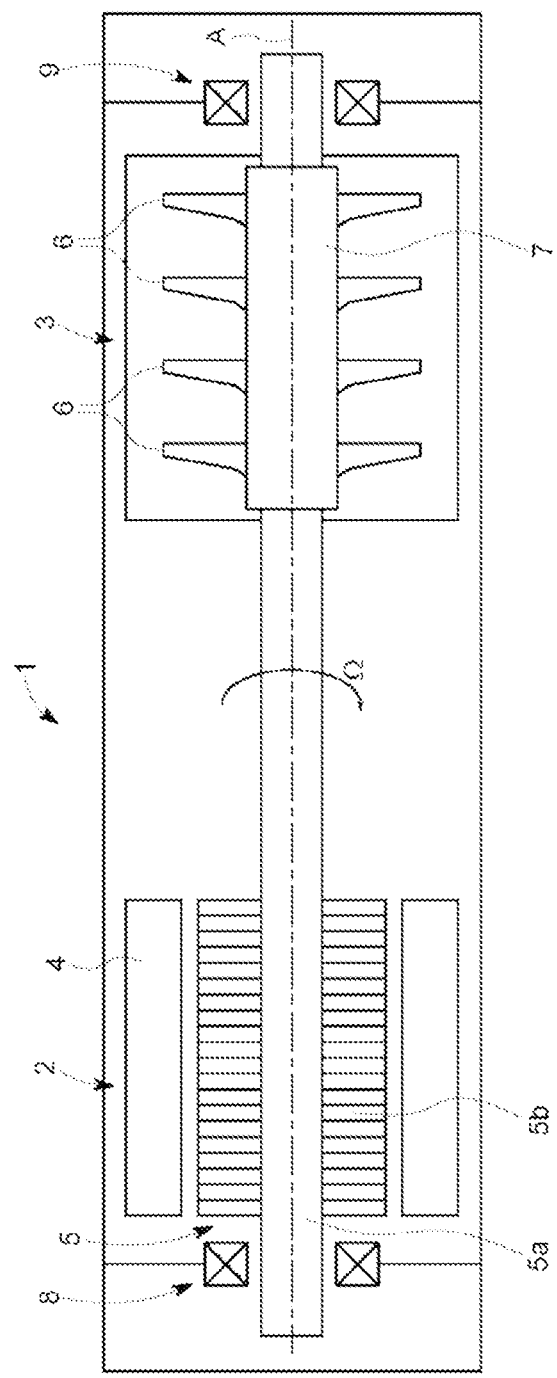
Figure 2:
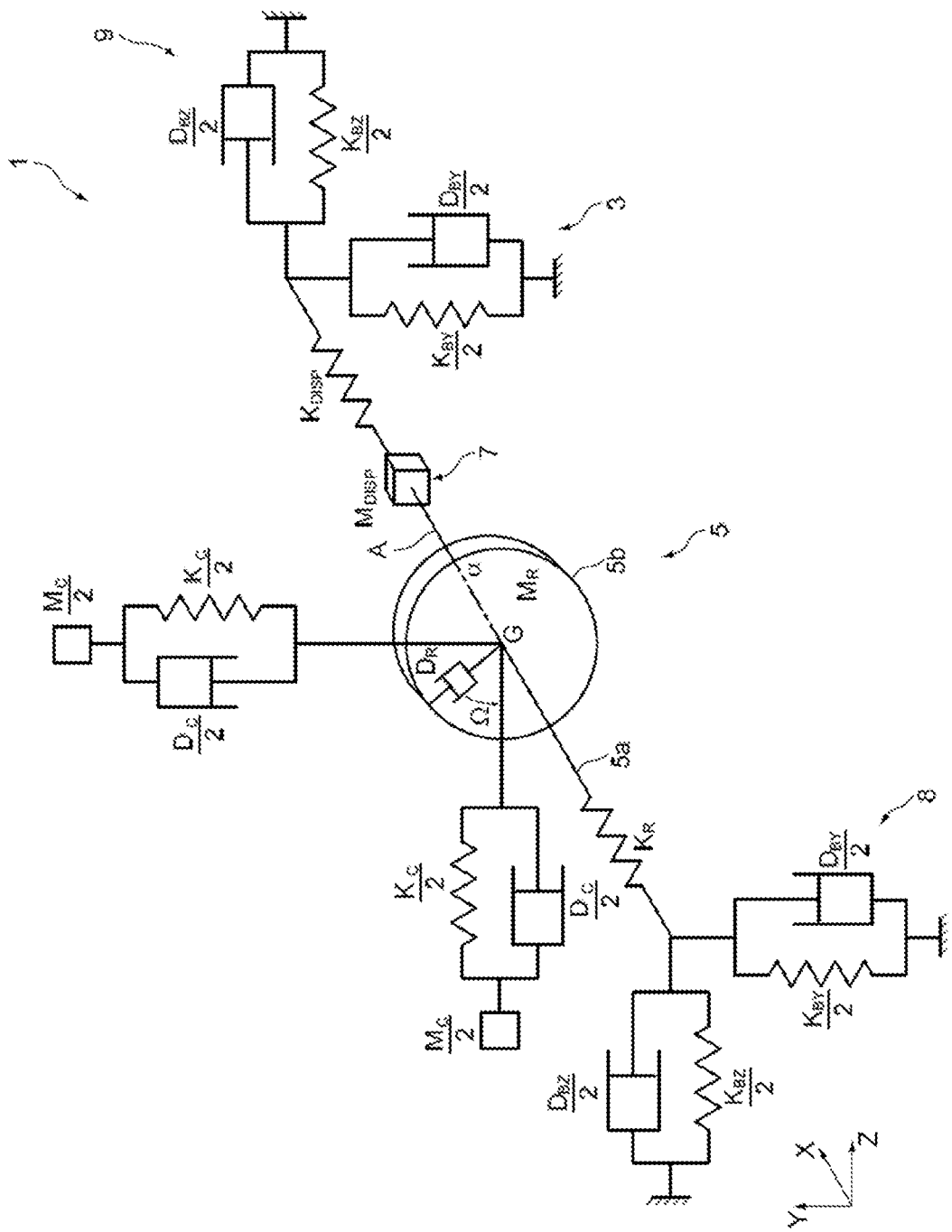
Figure 3:
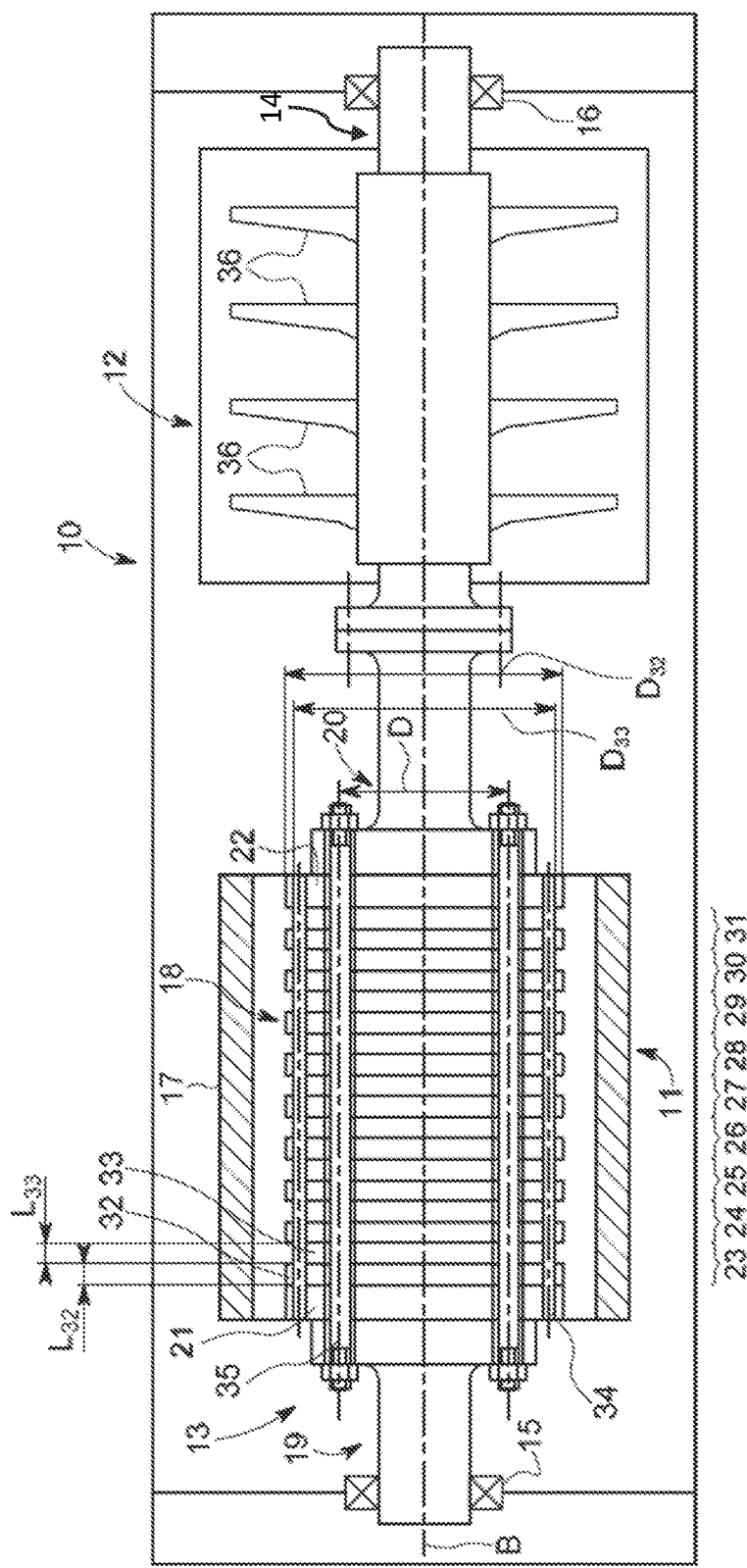
FIG. 3 illustrates an embodiment of a motor-compressor set.
Figure 3:
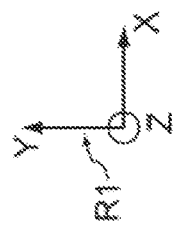

Reference is made to FIG. 3, which illustrates a cross section in an axial direction of an example embodiment of a motor-compressor set 10 comprising a rotary electrical machine 11 connected to a compression section 12.

The rotary electrical machine 11 comprises a rotor 13 comprising a non-through shaft of central axis B connected to a transmission shaft 14 of the compression section 12.

The rotor 13 and the transmission shaft 14 form a transmission line.

It is supposed hereinafter that the rotation frequency of the transmission line is situated in the hypercritical frequency domain of operation of the motor-compressor set 1 and is less than 500 Hz, the hypercritical frequency domain of the hypercritical transmission line all being the rotation frequencies higher than or equal to the first direct-precession bending resonant frequency of the transmission line.

The diameter of the transmission shaft 14 is sized according to the value of a torque to be transmitted.

The rotor 13 and the transmission shaft 14 are maintained in rotation by two bearings 15 and 16 situated respectively at the free end of the rotor 13 and of the transmission shaft 14.

The bearings 15 and 16 are for example bearings on an oil film, on a gas film, with magnetic levitation, or fluid bearings.

Generally, the bearings 15 and 16 comprise magnetic bearings.

The rotor 13 is inserted in a stator 17 of the rotary electrical machine 11 of the squirrel-cage asynchronous type.

In a variant, the rotary electrical machine 11 may be a machine of the wound-rotor asynchronous type or of the synchronous type with a wound rotor or with permanent magnets.

The rotor 13 with a non-through shaft comprises a cylindrical magnetic mass 18 enclosed between a first 19 and a second 20 half-shaft by means of two short-circuit disks 21 and 22, one end of the transmission shaft 14 being connected to the second half-shaft 20.

The magnet mass 18 comprises adjacent identical cells 23 to 31, each of the cells having a total length L.

The magnetic mass 18 comprises a periodic repetition of cells 23 to 31.

In a variant, the magnetic mass 18 may comprise a non-periodic repetition of cells 23 to 31.

The cells 23 to 31 are configured to prevent the propagation of metadamping in the rotor 13 over a range of excitation frequencies of the transmission line.

The excitation frequency range is for example between 0 and 5.5 kHz.

By placing the metadamping frequency range of the magnetic mass 18 of the rotor 13 beyond 5.5 kHz, the eigenmodes of the transmission line are not excited by the control of the magnetic bearings 15 and 16.

Each cell 23 to 31 comprises two circular elements 32 and 33 respectively with different outside diameters D32 and D33 and respectively with different thicknesses L32 and L33.

The circular elements 32 and 33 are produced from different materials, the first plate 32 being produced from a first material characterized by a Young's modulus $E_{32}$ and a density $\rho_{32}$, and the second plate 33 being produced from a second material characterized by a Young's modulus $E_{33}$ and a density $\rho_{33}$.

Naturally, each cell 23 to 31 may comprise more than two circular elements.

The circular elements are for example produced from magnetic steel in order to form magnetic plates, from copper, from non-metallic material or from plastics material. Furthermore, the adjacent circular elements may be separated from each other by varnish, a resin, an electrical insulator, a layer of paint, a ceramic deposit or any polymer.

The circular elements 32 and 33 forming adjacent magnetic plates may be separated by an electrical insulator.

In a variant, the outside diameters D32 and D33 may be identical.

According to another variant, the thicknesses L32 and L33 may be identical.

According to yet another variant, the first and second materials may be identical.

According to another embodiment, each cell 23 to 31 may comprise a stack of metal sheets, the thickness of the metal sheets preferably being greater than 5% of the outside diameter of the magnetic mass 18.

Conductive bars 34 are housed in the circular elements 32 and 33 and the short-circuit disks 21 and 22 so that the short-circuit disks 21 and 22 and the conductive bars 34 form a squirrel cage.

Tie rods 35 are distributed uniformly over a diameter D of the magnetic mass 18 so as to maintain the circular elements 32, 33 compacted between the half-shafts 19 and 20.

The compression section 12 comprises compression wheels 36 mounted on the transmission shaft 14 so that the rotor 13 rotates the wheels 36 in order to compress a gas or a fluid.

As the rotor 13 has a non-through shaft, the peripheral speed of the rotor 13 is not limited to 200 m/s, making it possible to improve the efficiency of the rotary electrical machine 11. The higher the rotation speed of the rotor 13, the greater the power developed by the rotary electrical machine 11.

More precisely, the motor-compressor set 10 can rotate at a hypercritical rotation frequency.

A direct reference frame R1(X, Y, Z) is defined, comprising an axis X coincident with the rotation axis of the rotor 13.

The calculation of the damping $D_{R13}$ of the rotor 13 is detailed hereinafter.

The rotor 13 is modeled by a beam of length L extending along the axis X in the reference frame XYZ, of cross section A.

As the rotation frequency of the rotor 13 is less than 500 Hz, it is accepted that the deformations of the cross section of the beam due to shear are ignored and that the rotation inertia effect is ignored.

The behavior under bending of the beam according to time t and the position x in the beam along the axis X when no force is applied to the rotor 13 is governed by:

$$E(x)I(x)\frac{\partial^4 y(x,t)}{\partial x^4} + \rho(x)A(x)\frac{\partial^2 y(x,t)}{\partial t^2} = 0 \qquad (4)$$

where

E(x) is the Young's modulus of the magnetic mass 18 equal to $E_{32}$ or $E_{33}$ according to the value of x, I(x) is the moment of inertia of the cross section along the axis x of the beam, and $\rho(x)$ is the density equal to $\rho_{32}$ or $\rho_{33}$ according to the value of x, and A(x) is the cross section of the rotor 13 according to the value of x.

Then the variables x and t are separated by introducing the complex function:

$$y(x,t) = Y(x)e^{-j\omega t} \qquad (5)$$

where $j^2 = -1$

The Young's modulus E(x) is replaced by a complex Young's modulus $\overline{E}(x)$ and the density $\rho(x)$ by a complex density $\overline{\rho}(x)$ such that:

$$\overline{E}(x) = E(x)(1 - j\eta_E \cdot \omega) \qquad (6)$$

where $\eta_E$ is the damping factor of the Young's modulus, and $$\overline{\rho}(x) = \rho(x)\left(1 - j\frac{\eta_\rho}{\omega}\right) \qquad (7)$$

where $\eta_\rho$ is the damping factor of the density.

The solution of equation (4) is of the type:

$$Y_1(x) = (A_1 e^{z1 \cdot x} + B_1 e^{z2 \cdot x} + C_1 e^{z3 \cdot x} + D_1 e^{z4 \cdot x})e^{-j\omega t} \text{ for } x \text{ being in the first plate 32} \qquad (8), \text{ and}$$

$$Y_2(x) = (A_2 e^{s1 \cdot x} + B_2 e^{s2 \cdot x} C_2 e^{s3 \cdot x} + D_2 e^{s4 \cdot x})e^{-j\omega t} \text{ for } x \text{ being in the second plate 33} \qquad (9),$$

the coefficients z1 to z4 and s1 to s4 being the roots of equation (4).

Figure 4A:
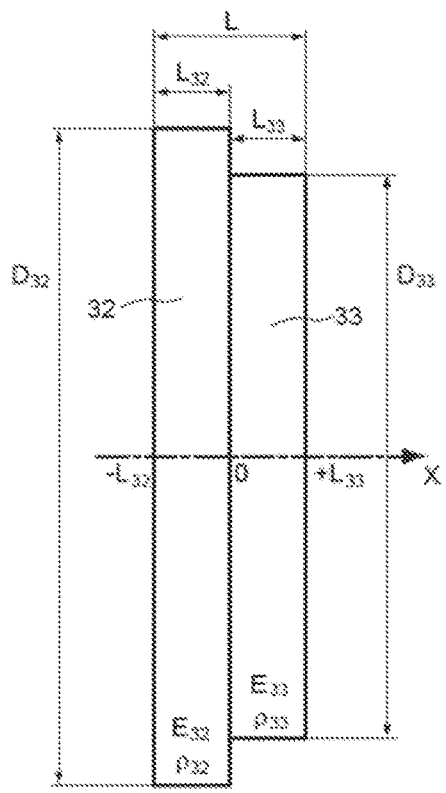
FIG. 4a illustrates an example of a cell.
Figure 4B:
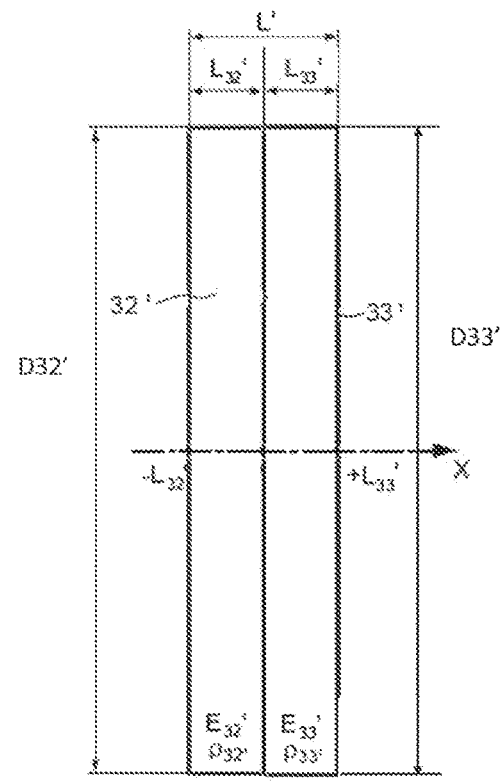
FIG. 4b illustrates an example of a cell having two circular elements comprise identical outside diameters.

As the magnetic mass 18 comprises a periodic repetition of identical cells 23 to 31 of period $L = L_{32} + L_{33}$, the Floquet-Bloch theorem is applied to equations (8) and (9):

$$Y_1(x) = (A_1 e^{z1 \cdot (x-L)} + B_1 e^{z2 \cdot (x-L)} + C_1 e^{z3 \cdot (x-L)} + D_1 e^{z4 \cdot (x-L)})e^{-j\omega t} e^{-\overline{k}L} \text{ for } x \text{ being in the first plate 32} \qquad (10), \text{ and}$$

$$Y_2(x) = (A_2 e^{s1 \cdot (x-L)} + B_2 e^{s2 \cdot (x-L)} + C_2 e^{s3 \cdot (x-L)} + D_2 e^{s4 \cdot (x-L)})e^{-j\omega t} e^{-\overline{k}L} \text{ for } x \text{ being in the second plate 33} \qquad (11),$$

where $\overline{k}$ is the complex Floquet wave number so as to be limited to one of the cells 23 to 31 shown in FIG. 4, equation (10) describing the deflection of the magnetic mass 18 for the values of x less than 0 and equation (11) describing the deflection of the magnetic mass 18 for the values of x greater than 0, the origin of the axis X being chosen at the interface of the first and second circular elements 32 and 33.

By symmetry, the coefficients z1 and s1, z2 and s2, z3 and s3, z4 and s4 are equal.

By applying the conditions at the limits of continuity of the moments and of the curvature effects, a matrix system of eight equations is obtained, comprising the eight coefficients $A_1$ to $D_1$ and $A_2$ to $D_2$ of equations (10) and (11).

Let $M(\bar{k},\omega)$ be the matrix containing the matrix system for an angular frequency $\omega 1$ of the frequency of rotation of the rotor 13.

The equation of the determinant DET of the matrix M equal to 0 is solved so as to determine the four complex values of $\bar{k}$ denoted $\bar{k}1$, $\bar{k}2$, $\bar{k}3$ and $\bar{k}4$.

Moreover, using equation (4), the following wave number is obtained:

$$\bar{k} = \sqrt{\omega} \left(\frac{\rho_h A_h}{E_h I_h}\right)^{\frac{1}{4}} \left(\frac{1-j\eta_\rho}{1-j\eta_E}\right)^{\frac{1}{4}} \quad (12)$$

where $$\rho_h A_h = \frac{1}{L}\int_0^L \rho(x)A(x)dx \quad (13)$$

$\rho(x)$ being equal to $\rho_{32}$ if x is between $-L_{32}$ and 0, and to $\rho_{33}$ if x is between 0 and $L_{33}$, and the cross-section $A(x)$ being calculated from the diameter $D_{32}$ is x is between $-L_{32}$ and 0, and from the diameter $D_{33}$ is x is between 0 and $L_{33}$;

$$\frac{1}{E_h I_h} = \frac{1}{L}\int_0^L \frac{dx}{E(x)I(x)} \quad (14)$$

$E(x)$ being equal to $E_{32}$ if x is between $-L_{32}$ and 0, and to $E_{33}$ if x is between 0 and $L_{33}$, and the moment of inertia $I(x)$ being calculated from the diameter $D_{32}$ if x is between $-L_{32}$ and 0, and from the diameter $D_{33}$ if x is between 0 and $L_{33}$.

Let $\eta_h$ be the homogenized Rayleigh damping coefficient representing the damping of the rotor 13.

$$\eta_h = \frac{\eta_\rho}{\omega} + \eta_E \cdot \omega \quad (15)$$

Using the values $\bar{k}1$, $\bar{k}2$, $\bar{k}3$ and $\bar{k}4$ determined during the calculation of the determinant DET of the matrix $M(\bar{k},\chi)$ for the angular frequency $\omega 1$ and equation (12) for to equal to $\omega 1$, the following equations are obtained, making it possible to calculate the coefficient $\eta_h$ for the angular frequency to $\omega 1$:

$$Re(\bar{k}i)=F1(\eta_\rho,\eta_E) \quad (16)$$

$$Im(\bar{k}i)=F2(\eta_\rho,\eta_E) \quad (17)$$

i varying from 1 to 4 where Re is the real part of $\bar{k}i$ and Im is the imaginary part of $\bar{k}i$.

The coefficient $\eta_h$ the angular frequency $\omega 1$ varying from 0 rad/s to 34557 rad/s (i.e. 5.5 kHz) is calculated for various values of $L_{32}$, $L_{33}$, $D_{32}$, $D_{33}$, $E_{32}$, $E_{33}$, $\rho_{32}$ and $\rho_{33}$.

Following a variational analysis the amplitude of the metadampings in the frequency domain considered is the smallest when each cell 23 to 31 comprises a single plate.

Figure 5:
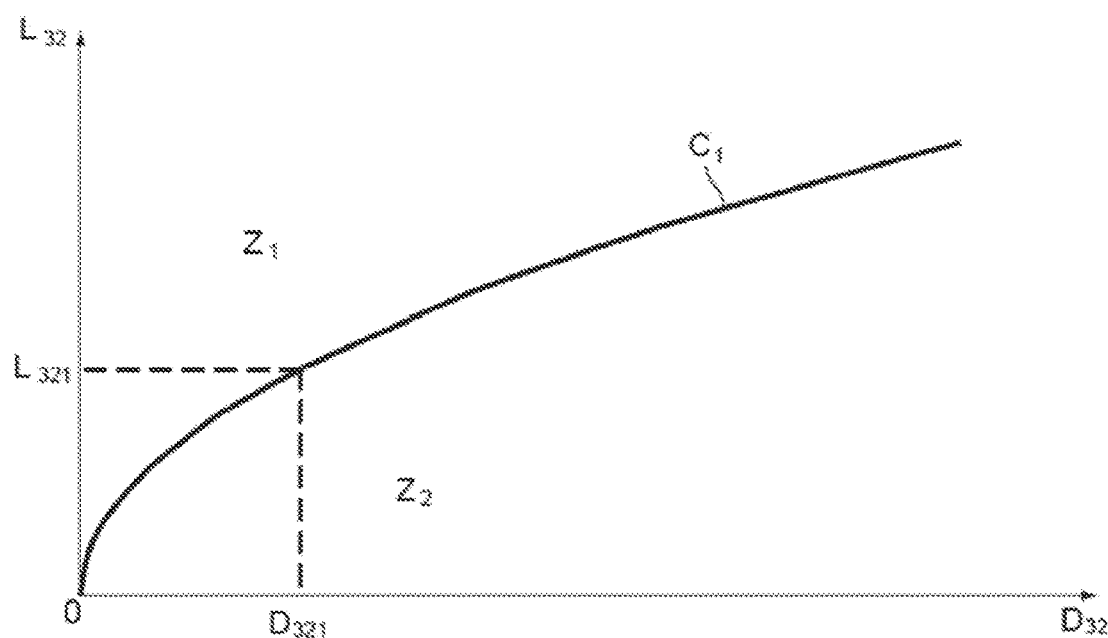
FIG. 5 shows an example of a curve representing the homogenized Rayleigh damping coefficient.

FIG. 5 shows a curve C1 representing the value of the diameter $D_{32}$ as a function of the thickness $L_{32}$, each cell 23 to 31 including only the plate 32.

The pairs of values ($D_{32}$, $L_{32}$) situated in the zone Z1 above the curve C1 generate metadampings in the rotor 13 for frequencies below 5.5 kHz, and the pairs of values ($D_{32}$, $L_{32}$) situated in the zone Z2 under the curve C1 generate, in the rotor 13, metadampings the amplitudes of which are not liable to cause instability of the rotor 13 for frequencies above 5.5 kHz.

For example, a rotor 13 comprising cells 23 to 31 each including a plate having a Young's modulus $E_{32}$, a density $\rho_{32}$, a thickness $L_{321}$ and a diameter $D_{321}$ is not unstable in the frequency domain ranging from 0 to 5.5 kHz if, for the value of the diameter $D_{32}$ fixed at $D_{321}$, the value of $L_{32}$ is less than L321, otherwise the rotor 13 is unstable.

The method described above makes it possible to control the vibratory behavior of the rotor 13 in order to minimize the metadampings due to the rotating parts that may cause instability at the hypercritical rotation frequencies and thus determine a range of rotation frequencies minimizing metadampings.

The transmission chain driven by the rotor 13 functions in a hypercritical rotation frequency domain without presenting any risk of instability.

Functioning in the hypercritical rotation frequency domain makes it possible to increase the overall efficiency and the compression ratio of the motor-compressor set 10.

In a variant, the rotor 13 may be connected to a mechanical device configured to drive the rotor 13 so that the rotary electrical machine 11 functions in generator mode in order to produce electric power, the assembly comprising said device and the electric machine functioning at a hypercritical rotation frequency.

As the electric power produced is proportional to the rotation speed of the rotor of said machine, the efficiency of said machine is improved.

Naturally, the sizing of the rotor 13 as defined above, and so that it functions at a hypercritical rotation frequency of the transmission line, applies for any mechanical system comprising a transmission shaft connected to the rotor.

We claim:

1. A rotor for an electrical machine with a non-through shaft intended to drive a transmission line being formed by the rotor and a transmission shaft, the rotor comprising:
   two half-shafts enclosing a cylindrical magnetic mass, by means of two short circuit disks, characterized in that the cylindrical magnetic mass comprises at least two adjacent identical cells, the at least two adjacent identical cells being arranged in a periodic repetition along a length of the cylindrical magnetic mass, wherein each cell (i) includes at least two circular elements each made of a magnetic material having a Young's modulus value and a density value with a thickness and a diameter, the Young's modulus value and the density value of a first magnetic material of a first circular element of the at least two circular elements being different from the Young's modulus value and the density value of a second magnetic material of a second circular element of the at least two circular elements and (ii) is configured to prevent a propagation of metadamping in the rotor.

2. The rotor of claim 1, wherein each circular element is made from a different material.

3. The rotor of claim 1, wherein the at least two circular elements comprise identical outside diameters.

4. The rotor of claim 1, wherein the at least two circular elements comprise different outside diameters.

5. The rotor of claim 1, wherein the at least two circular elements are made from identical materials.

6. The rotor of claim 1, wherein each circular element is produced from magnetic steel, copper or plastics material.

7. The rotor of claim 1, further comprising conductive bars housed in the at least two circular elements and the two short circuit disks so that the two short circuit disks and the conductive bars form a squirrel cage.

8. The rotor of claim 1, wherein a plurality of rotation frequencies range of the transmission line extends from 0 to 500 Hz.

9. A rotary electrical machine comprising the rotor according to claim 1.

10. The rotary electrical machine according to claim 9, wherein the rotary electrical machine is of an asynchronous type with a squirrel cage.

11. A mechanical system comprising the rotary electrical machine according to claim 9 and a mechanical device comprising a transmission shaft, the transmission shaft being connected to one of the rotor half-shafts.

12. A motor-compressor set comprising at least one compression section and the rotary electrical machine according to claim 9 driving said at least one compression section.

13. A method for sizing a rotor with a non-through shaft for an electrical machine driving a transmission line being formed by the rotor and a transmission shaft, the rotor comprising two half-shafts enclosing a cylindrical magnetic mass, by means of two short circuit disks, with the cylindrical magnetic mass comprising at least two adjacent identical cells, the at least two adjacent identical cells being arranged in a periodic repetition along a length of the cylindrical magnetic mass, wherein each cell includes at least two circular elements each made of a magnetic material having a Young's modulus value and a density value, the Young's modulus value and the density value of a first magnetic material of a first circular element of the at least two circular elements being different from the Young's modulus value and the density value of a second magnetic material of a second circular element of the at least two circular elements, the method comprising:

sizing of a cell of the at least two adjacent identical cells to determine and configure a thickness and a diameter of the at least two circular elements that prevent a propagation of metadamping in the rotor.

14. The method of claim 13, wherein a plurality of rotation frequencies range of the transmission line extends from 0 to 500 Hz.

15. The method of claim 13, wherein the sizing of the cell is done analytically using a beam model.

16. The method of claim 13, wherein the rotor further comprises conductive bars housed in the at least two circular elements and the two short circuit disks so that the two short circuit disks and the conductive bars form a squirrel cage.

17. The rotor of claim 13, wherein the sizing of the cell is done analytically using a beam model.

* * * * *